June 21, 1949.  V. G. PLATTS  2,473,765
LIQUID FLOW MEASURING APPARATUS
Filed Nov. 20, 1944
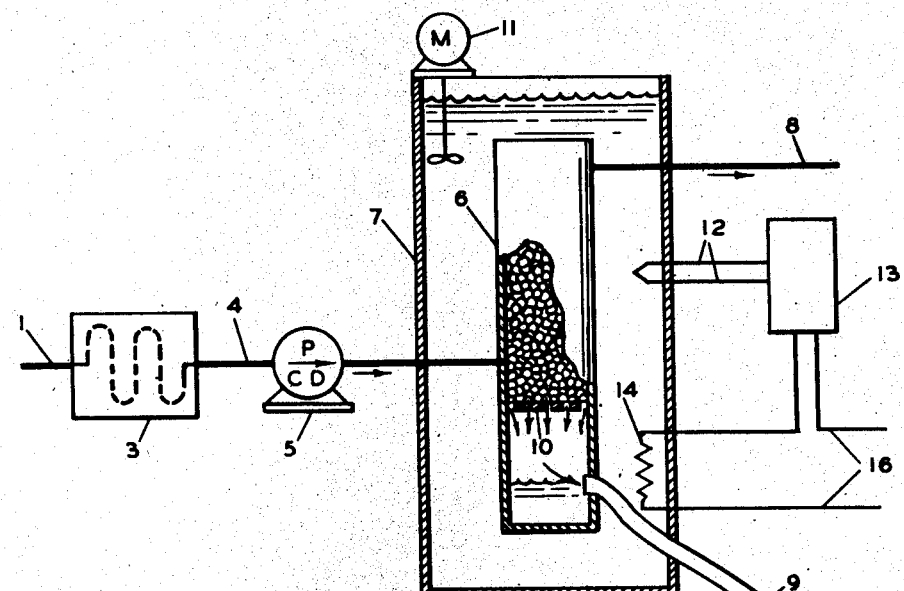
FIG.-1
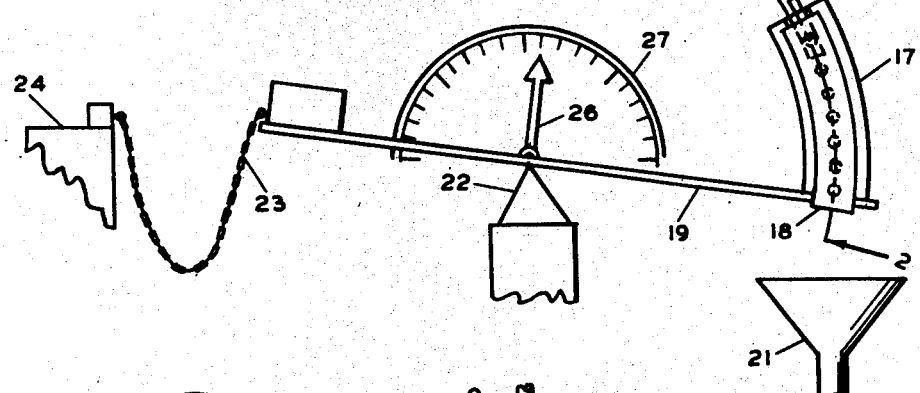
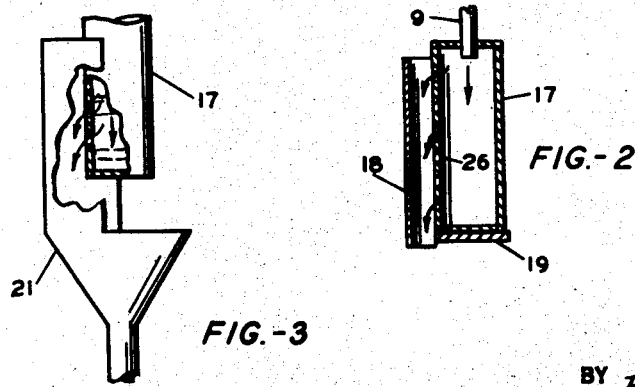
FIG.-2
FIG.-3
INVENTOR
V. G. PLATTS
BY Hudson & Young
ATTORNEYS Patented June 21, 1949

2,473,765

UNITED STATES PATENT OFFICE 2,473,765

LIQUID FLOW MEASURING APPARATUS

Vern G. Platts, Phillips, Tex., assignor to Phillips Petroleum Company, a corporation of Delaware Application November 20, 1944, Serial No. 564,321

3 Claims. (Cl. 73—215)

This invention relates to means for measuring rates of flow.

It is an object of this invention to provide a device or meter for measuring the rate of flow of a fluid.

Other objects and advantages will be apparent to those skilled in the art from the following description of the invention and from the accompanying drawing and claim.

In the drawing:

Figure 1 is an elevational view with some parts in cross-section of a device for determining the degree of conversion in a hydrocarbon conversion process embodying one modification of the present invention.

Figure 2 is a cross-sectional view taken along line 2—2 in the direction indicated of element 17 of the device of Figure 1.

Figure 3 is a similar view of a modified element 17 of Figure 1 with a part of the element broken away to show the interior.

In Figure 1 a device comprising the various elements is shown for the determination of the degree of conversion of a chemical process wherein there are conduits 1 and 4 to convey fluids to a packed column 6. Cooler 3 is provided, if necessary, to cool or condense the fluid. A constant delivery pump 5 may be used to deliver a constant volume of liquid to the elements of the present device. Surrounding column 6 is a constant temperature bath 7, shown in cross-section, provided with a stirrer 11, and a temperature control and heating system comprising thermocouples 12, temperature controller 13, electric resistor 14, and electric lead wires 16. Constant temperature bath 7 contains a fluid therein comprising either a liquid or a gas, whichever is most desirable under the circumstances. Conduit 8 is a vapor outlet means located in the upper portion of column 6 and conduit 9 is a liquid outlet located in the lower portion of column 6. Column 6 is packed with glass beads or ceramic objects or rocks and the like. The glass beads are supported on a perforated plate or screen 10 which is positioned a sufficient distance from the bottom of column 6 to allow the accumulation of liquid therein without rising into the packed portion of the column. Conduit 9 is free-flowing so that the liquid level within column 6 is maintained at the level of the outlet of conduit 9 at all times. Thus, column 6 may serve as a stripping or distillation column for liquid mixtures wherein vapors are discharged at the top and liquids are discharged out the bottom.

Element 17 is a reservoir comprising a tank or cylinder having perforations spaced vertically on the side thereof as shown in Figure 1 and a shield 18 attached thereto. Reservoir 17 functions as a receiver for liquids discharged from column 6, and shield 18 serves to direct the flow of the liquids in reservoir 17 from the perforations into funnel 21 for disposal. A balance, comprising a stationary frame 24 and a pivoted frame 19 pivoted by means of a fulcrum 22, is provided as a means of supporting reservoir 17 which is positioned eccentric to said pivot or fulcrum. Chain 23 is attached to the stationary frame 24 and to one arm of the pivoted frame 19, as shown, so as to hang freely therefrom. Chain 23 counterbalances reservoir 17 for any position of the arms of pivoted frame 19. Thus, as the liquid level in reservoir 17 rises, the position of the pivoted frame 19 changes such that an increased amount of chain 23 is supported by the balance. In this way the pivoted frame will have a certain stationary position for any level of liquid in reservoir 17 and the position of the pivoted frame corresponding to the level of liquid is shown by an indicator 26 on a calibrated scale 27. Conduit 9 is curved to conform to the curvature of reservoir 17 so that whatever the position assumed by pivoted frame 19 and reservoir 17, conduit 9 will always be inserted in reservoir 17 but not touching reservoir 17. Conduit 9 and reservoir 17 may be curved about the beam pivot 22 of balance 19 as the center in order that conduit 9 may pass freely into reservoir 17 for any position of reservoir 17.

In Figure 2 is shown a cross-sectional view along line 2—2 of reservoir 17 of Figure 1 in the direction shown. Conduit 9 is inserted into open reservoir 17 wherein perforations 26 are spaced vertically on the side thereof and shield 18 is attached to reservoir 17 to direct the flow of liquid from perforations 26.

In Figure 3 is shown a modified embodiment of reservoir 17 similar to Figure 2. A shield is integral with funnel 21 rather than to reservoir 17 as in Figure 2. In this manner the shield is independent of reservoir 17 and balance 19. Funnel 21 is used for the disposal of the liquid overflowing from reservoir 17 through the perforations therein.

Operation

In operation of the device shown in Figure 1, fluid from the reaction chamber or other unit of a process comprising a mixture of high-boiling and low-boiling liquid is conducted through line 1 to cooler 3 where the fluid is cooled to the desired temperature and in which any vapors present are condensed. A liquid mixture is then passed through line 4 to packed column 6 in a continuous flow by constant delivery pump 5. The volume of liquid per unit of time that enters column 6 is maintained constant by pump 5 or a constant flow regulator or any other suitable device for controlling the flow of liquid. In many cases cooler 3 will not be needed and therefore may be omitted. The liquid mixture entering column 6 is partially vaporized affording a separation of high-boiling liquids from the low-boiling liquids; the vapors flow overhead through conduit 8; the liquids accumulate in the lower portion of column 6 and are constantly discharged through conduit 9. A suitable temperature is maintained in column 6 by the constant temperature bath 7, or any other constant temperature means. In using constant temperature bath 7, a liquid such as water or oil is contained therein and heated by electric resistor 14 to the desired temperature. With the aid of thermocouple 12 and controller 13 inserted in line 16, the amount of heat supplied to the bath is controlled to maintain a constant temperature. To assure a uniform distribution of the heated liquid, stirrer 11 is provided for the circulation of the liquid in the bath.

Various methods of heating the constant temperature bath 7 other than by electrical resistors are available. These methods include the use of steam, circulation of hot oils, or any type of heat exchange with fluids. On the other hand, it may be unnecessary to maintain an elevated temperature in column 6 and in such a case constant temperature bath 7 and accessories may be dispensed with. Column 6 may be maintained at atmospheric temperature by the natural circulation of air around the column.

Column 6 should be designed for the particular composition of the mixture entering so that the desired relatively high-boiling liquids are separated from the other liquids in the mixture. In this capacity, the column 6, containing beads or rocks or the like, serves as a stripping or distillation column.

Generally, it is desirable to maintain a certain amount of liquid in column 6 for efficient stripping of vapors from the liquid. However, in some cases it may not be necessary to maintain a liquid level in column 6, and therefore, the liquid may be conducted immediately from the column as it is separated from the mixture. In case liquids are maintained in the bottom of the column 6 they must be kept at a constant height so when the liquids are separated, the liquids flowing through conduit 9 will correspond to the actual amount of relatively high-boiling liquids separated. Maintaining a continuous flow through conduit 9 corresponding to liquids separated in column 6 may be accomplished very simply by making conduit 9 a free-flowing means allowing liquids in column 6 to continually flow out the conduit regardless of the rate of separation in the column.

Vapors from column 6 may be cooled for storage or recycled to their source.

The liquids discharged through conduit 9 and flowing at the rate of its separation in column 6 enters reservoir 17 where they partially accumulate. The height of the liquids in reservoir 17 depends upon the rate of flow of the liquids therein. Liquids flow out of reservoir 17 through perforations spaced vertically in said reservoir and are directed by shield 18 into funnel 21 for disposal or recovery. As the liquid level in reservoir 17 increases the rate of flow from reservoir 17 through perforations therein also increases, because the higher the liquid level the more perforations there are for liquids to flow through. The final height of liquids in reservoir 17 will correspond to the rate of flow of liquids into said reservoir. To counterbalance the liquids accumulated in reservoir 17 pivoted frame 19 swings to the right on pivot or fulcrum 22 on stationary frame 24 and in so doing lifts counterbalance chain 23. Since chain 23 is supported by both stationary and pivoted frames, 24 and 19, respectively, the pivoted frame will continue to swing to the right until the weight of chain 23 supported by pivoted frame 19 rather than by the stationary frame 24 counterbalances the liquids accumulated in reservoir 17. When perfect balance is reached between chain 23 and the liquid level in reservoir 17, the pivoted frame becomes stationary and its position is indicated by pointer 26 on a calibrated scale 27. Scale 27 may be conveniently calibrated to show the percentage of yield of a particular product which may be either the liquids or the vapors discharged from column 6.

If the rate of flow of liquids through conduit 9 decreases, the height of liquids in reservoir 17 also decreases with the consequent result that pivoted frame 19 will swing to the left thereby allowing stationary frame 24 to support more of the chain 23. In this manner the pivoted frame again becomes balanced and the degree of conversion, which is proportional to the rate of flow of liquids, is indicated on scale 27. It should be noted that the indicator hand actually denotes the weight of liquids in reservoir 17 on scale 27 and that the liquid level in reservoir 17 is proportional to the flow of liquids through conduit 9 from column 6. This flow of liquids through conduit 9 is also directly proportional to the amount of high-boiling liquids separated from the liquid mixture entering column 6 through line 4, and this separation of liquids is proportional to the amount of high-boiling liquids flowing in the reaction chamber or other unit of the chemical process in which this device is being used. This amount of high-boiling liquids may be conveniently calculated to designate the amount of conversion product formed in the reaction chamber of a process.

In case the high-boiling liquids constitute the reaction product, with the knowledge of the amount of high-boiling liquids present before entering the reaction chamber and with the indication by the present device of the amount of high-boiling liquids present after the reaction chamber the amount of conversion can be determined. Where the amount of high-boiling liquids of a mixture entering the reaction is not constant, the device of the present invention should be installed both at the inlet and the outlet to the reaction chamber. Even if the conversion product is a vapor, the present device can be used to determine the degree of conversion. In such a case the decrease in amount of high-boiling liquids on passing through the column may be an indication of the amount of conversion. Many variations and alterations are possible to determine the amount of product formed in a process. To calibrate the scale several batch analyses should be taken simultaneously with various readings on the device and from the results of the batch analyses the scale is calibrated.

In Figure 2 the flow of liquids through reservoir 17 is shown. Liquids enter reservoir 17 through conduit 9 and accumulate therein. Simultaneously, liquids flow out through perforations 26 and are directed downward through shield 18 into a disposal means.

In Figure 3 liquids flow from reservoir 17 in a similar manner as in Figures 1 and 2, but are directed into a funnel 21 by a shield integral to said funnel 21 rather than attached to said reservoir itself.

Cooler 3 and constant temperature bath 7, as previously indicated, are not always necessary in the application of this device. Also, counterbalance chain 23 is only one of several means of having an automatic counterbalancing device for liquid level in reservoir 17. Any flexible member of a substantially uniform weight per unit of length may be suspended between the pivoted and stationary frames, or various other methods for counterbalancing reservoir 17 may be used instead of a chain or flexible member. In the application of this device indicator 26 and scale 27 are also not essential since any convenient means of indicating the position of the balance and thus the weight or proportion of high-boiling liquids in a mixture may be used. Column 6 may also be any type of separation unit, but preferably it is of the type described, functioning more or less as a distillation column for accurate separation of high-boiling and low-boiling liquids.

This device may also be used primarily for the purpose of measuring the rate of flow of liquids, and in so doing the packed column 6, pump 5, and constant temperature bath 7 and accessories are eliminated. In such manner the balance and perforated reservoir 17 provide a convenient apparatus for the continuous and automatic determination of the rate of flow of liquids. When so used, the scale 27 may be graduated in units of rate of flow of liquid.

In regard to the reservoir 17, this may be any type of reservoir such that the liquid accumulating will be proportional to the flow of liquids therein. It is essential that the liquids run out of this reservoir as fast as they flow into it; but in so doing it will maintain a level according to the quantity of liquids passing through the reservoir. The greater the rate of flow of liquids into the reservoir the higher the level will be, and as the level rises or falls in the reservoir, the end of the pivoted frame will also fall or rise accordingly. In constructing a reservoir of the type indicated in Figure 1 by numeral 17, the perforations therein should be accurately spaced in such manner as to allow the liquid level to rise uniformly according to the rate of flow of liquid into the cylinder. This will assure a smooth operation of the pivoted frame 19 and provide a means for convenient calibration of the scale of 27.

The fluid entering through line 1 into cooler 3 may be a mixture of liquids and vapors or may be entirely liquids and may consist of a two-component system or a multi-component system. In order to assure constant flow of mixture into column 6 by means of constant delivery pump 5 it is desirable to have the mixture entirely liquid. In case of a multi-component system one or more of the components representing the low- or high-boiling liquids are withdrawn either as vapors or liquids. In some cases it may be undesirable or impracticable to make a complete separation of the relatively low- and high-boiling liquids, and in such cases a partial separation is made and the degree of conversion determined therefrom since it is not essential that a complete separation be made to obtain accurate results by this invention.

This device may be applied to both organic and inorganic chemical processes wherein the reactants and products are either liquids or vapors. The device will find particular application in the petroleum field in the conversion of hydrocarbons where it is desirous of determining at all times the exact operations of the several units of a process.

For example, in the polymerization of butene to octane a fluid is withdrawn from the reaction chamber comprising octane product and unreacted butene. Thus, the vapor from the packed column 6 is unconverted butene and the liquid is octane or polymerized gasoline. The polymerized octane is the product and the measurement of its quantity by the device is the direct measurement of the conversion for any particular time. For this application, the scale 27 would be calibrated to show directly the degree of conversion of butene to octane.

While my invention is particularly useful in determining the degree of conversion in petroleum processes it also could be used as well to advantage in many other types of processes where it is desired to know the amount of a certain component formed at a particular time, or the rate of flow of a particular component at a certain time.

Having described a preferred form of my invention and having pointed out the principal considerations to be observed in the construction of equivalent systems, it is obvious that various other changes can be made without departing from the invention, and it is to be understood that the invention is to be limited only by the scope of the appended claims.

Having described my invention, I claim:

1. A device for continuously measuring the rate of flow of liquids comprising in combination, a stationary frame, a pivoted frame pivoted to said stationary frame, a reservoir mounted on said pivoted frame eccentric to its pivot and positioned to receive said liquids to be measured therein, said reservoir comprising a tank having perforations spaced vertically thereon, means for constantly balancing said reservoir and contents comprising a flexible member of substantially uniform weight per unit length suspended freely from said stationary and said pivoted frames, and means connected with said pivoted frame for indicating the weight of said reservoir and contents in terms of rate of flow of said liquid therein.

2. A device for continuously measuring the rate of flow of liquid comprising in combination a stationary frame, a pivoted frame pivoted to said stationary frame, a reservoir mounted on said pivoted frame eccentric to its pivot and positioned to receive liquid to be measured therein, said reservoir comprising a tank with perforations spaced vertically and a shield attached to said tank to direct liquid flowing from said perforations, means for constantly balancing said reservoir and contents comprising a flexible member of substantially uniform weight per unit length suspended freely from said stationary and said pivoted frames, and means connected with said pivoted frame for indicating the weight of said reservoir and contents in terms of rate of flow of liquid therein.

3. A device for continuously measuring the rate of flow of liquid comprising in combination a stationary frame, a pivoted frame pivoted to said stationary frame, a reservoir mounted on said pivoted frame eccentric to its pivot and positioned to receive liquid to be measured therein, said reservoir comprising a tank with perforations spaced vertically and with its vertical axis curved about said pivot, a shield attached to said tank to direct liquid flowing from said perforations, a conduit means having its longitudinal axis parallel to the curved vertical axis of said tank and extending into the upper portion of said tank, means for constantly balancing said reservoir and contents comprising a flexible member of substantially uniform weight per unit length suspended freely from said stationary and said pivoted frames, and means connected with said pivoted frame for indicating the weight of said reservoir and contents in terms of rate of flow of liquid therein.

VERN G. PLATTS.

REFERENCES CITED

The following references are of record in the file of this patent:

UNITED STATES PATENTS

| Number | Name | Date |
|---|---|---|
| 1,049,718 | Howard | Jan. 7, 1913 |
| 1,203,686 | Becker | Nov. 7, 1916 |
| 1,328,920 | Graybill | Jan. 27, 1920 |
| 1,505,293 | Serrell | Aug. 19, 1924 |
| 1,999,954 | Bohan et al. | Apr. 30, 1935 |
| 2,165,705 | Houser | July 11, 1939 |
| 2,306,606 | Hirsch | Dec. 29, 1942 |
| 2,350,006 | Wolfner | May 30, 1944 |

FOREIGN PATENTS

| Number | Country | Date |
|---|---|---|
| 434,375 | Great Britain | Aug. 30, 1935 |